United States Patent
Whillock

(10) Patent No.: US 8,446,521 B2
(45) Date of Patent: May 21, 2013

(54) DISTRIBUTED AGILE ILLUMINATION SYSTEM AND METHOD

(75) Inventor: Rand Whillock, North Oaks, MN (US)

(73) Assignee: Honeywell International Inc., Morristown, NJ (US)

( * ) Notice: Subject to any disclaimer, the term of this patent is extended or adjusted under 35 U.S.C. 154(b) by 339 days.

(21) Appl. No.: 12/619,473

(22) Filed: Nov. 16, 2009

(65) Prior Publication Data

US 2011/0115969 A1    May 19, 2011

(51) Int. Cl.
*H04N 5/222* (2006.01)

(52) U.S. Cl.
USPC ........................................................ 348/370

(58) Field of Classification Search
USPC ........................................................ 348/370
See application file for complete search history.

(56) References Cited

U.S. PATENT DOCUMENTS

| | | | | |
|---|---|---|---|---|
| 4,931,916 | A * | 6/1990 | Callahan | 362/272 |
| 6,079,862 | A * | 6/2000 | Kawashima et al. | 382/103 |
| 7,800,643 | B2 * | 9/2010 | Hama | 348/135 |
| 2004/0227813 | A1 * | 11/2004 | Perry | 348/135 |
| 2008/0075334 | A1 | 3/2008 | Determan et al. | 382/117 |
| 2008/0075445 | A1 | 3/2008 | Whillock et al. | 396/106 |
| 2008/0201579 | A1 | 8/2008 | Whillock | 713/186 |
| 2008/0211916 | A1 | 9/2008 | Ono | |
| 2008/0247606 | A1 | 10/2008 | Jelinek | 382/115 |
| 2008/0277601 | A1 * | 11/2008 | Phinney et al. | 250/505.1 |
| 2009/0092283 | A1 | 4/2009 | Whillock et al. | 382/103 |
| 2009/0232418 | A1 | 9/2009 | Lolacono et al. | |

FOREIGN PATENT DOCUMENTS

WO    WO 2010/027250 A2    3/2010

OTHER PUBLICATIONS

GB Search Report for GB1018290.5 dated Mar. 1, 2011.

* cited by examiner

*Primary Examiner* — James Hannett
(74) *Attorney, Agent, or Firm* — Kermit D. Lopez; Luis M. Ortiz; Melissa Silverstein

(57) ABSTRACT

A distributed agile illumination system and method associated with multiple coordinated illumination sources for projecting a large amount of illumination on a subject at a distance and with an eye safe level of illumination at a close range. An entire scene may be imaged via an image capturing device and a targeted subject with respect to the scene may be detected and prioritized. An initial calibration may be performed to determine a relative geometric location of the illumination sources and the image capturing device with respect to each other. The subject's predicted location and the geometric location may be employed to determine an offset position for each of the independent illumination sources. A pan/tilt device and optional mirror associated with each illumination source utilizes the offset position to point each illumination source towards the subject to acquire better imagery at varying subject distances.

17 Claims, 3 Drawing Sheets

DISTRIBUTED AGILE ILLUMINATION SYSTEM AND METHOD

TECHNICAL FIELD

Embodiments are generally related to imaging systems and methods. Embodiments are also related to biometric acquisition and surveillance systems. Embodiments are additionally related to techniques for eye-safe illumination in the context of biometric systems.

BACKGROUND OF THE INVENTION

The capture of a high-quality image associated with a moving subject in a low-light situation is necessary for security and surveillance applications such as, for example, biometric acquisition. Biometric acquisition and surveillance require good illumination of the subject to acquire a high quality image for biometric processing. Many other constraints such as, for example, subject motion tolerance and depth of focus, may be relaxed if the level of illumination is increased.

Imaging systems employed in security and surveillance may be designed to generate accurate images of subjects utilizing a camera and a near infrared (IR) illumination so that they are inconspicuous and able to work in darkness. In addition, some applications, such as iris biometrics, are designed to acquire images illuminated with near infrared (IR) illumination. In some instances, infrared illumination may cause damage to, or otherwise alter, the object being imaged. One such object that can be damaged by excessive illumination is the human eye. In the majority of prior art imaging systems, the intensity of light from the infrared illumination projected onto the subject does not vary as the distance between the camera lens and the subject is varied. Hence, the amount of power that a flash may require to sufficiently illuminate a specific subject at a distance may easily exceed eye safety limits if the subject is positioned at a close range. The fundamental problem is to get as much illumination as possible on a subject at longer ranges while maintaining eye safe levels at close ranges.

Based on the foregoing, it is believed that a need exists for an improved distributed agile illumination system and method for projecting a large amount of illumination on a specific subject at a long distance and at an eye safe level of illumination and additionally at a close range, as described in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved imaging systems and methods.

It is another aspect of the disclosed embodiments to provide for an improved distributed agile illumination system that includes the use of multiple coordinated illumination sources.

It is a further aspect of the disclosed embodiments to provide for an improved method for determining an offset position for each independent illumination source in the context of biometric acquisition and/or surveillance.

The aforementioned aspects and other objectives and advantages can now be achieved as described herein. A distributed agile illumination system and method is disclosed, which includes the use of multiple coordinated illumination sources for projecting a large amount of illumination on a subject at a larger distance yet each individual illuminator is eye safe at close ranges. An entire scene may be imaged via an image capturing device (e.g., a wide field of view camera (WFOV)) and a targeted subject with respect to the scene may be detected and prioritized. An initial calibration may be performed to determine a relative geometric location of the illumination source(s) and the image capturing device with respect to each other. The subject predicted location and the geometric location may be employed to determine an offset position for each of the independent illumination sources. A pan/tilt device associated with each illumination source utilizes the offset position to point each illumination source towards the subject to acquire better imagery at varying subject distances. The multiple illumination sources individually emit eye safe levels of illumination, but when pointed at the subject at a distance, can provide additional illuminations.

The wide field of view camera may be employed for surveillance of a scene having, for example, one or more subjects of interest, such as people. The pan/tilt device may be connected to the illumination sources for controlling the motion of the illumination sources or of mirrors interposed between the illumination sources and the intended subject. The multiple illumination sources may be spatially separated so that at close ranges the subject is not in a position to absorb light from more than one illumination source. The independent illumination source(s) can be pointed in an appropriate direction to converge and combine their illuminations on the subject at longer distances. Such an approach ensures that the subject may be prevented from being illuminated with unsafe levels of high intensity illumination at any range.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
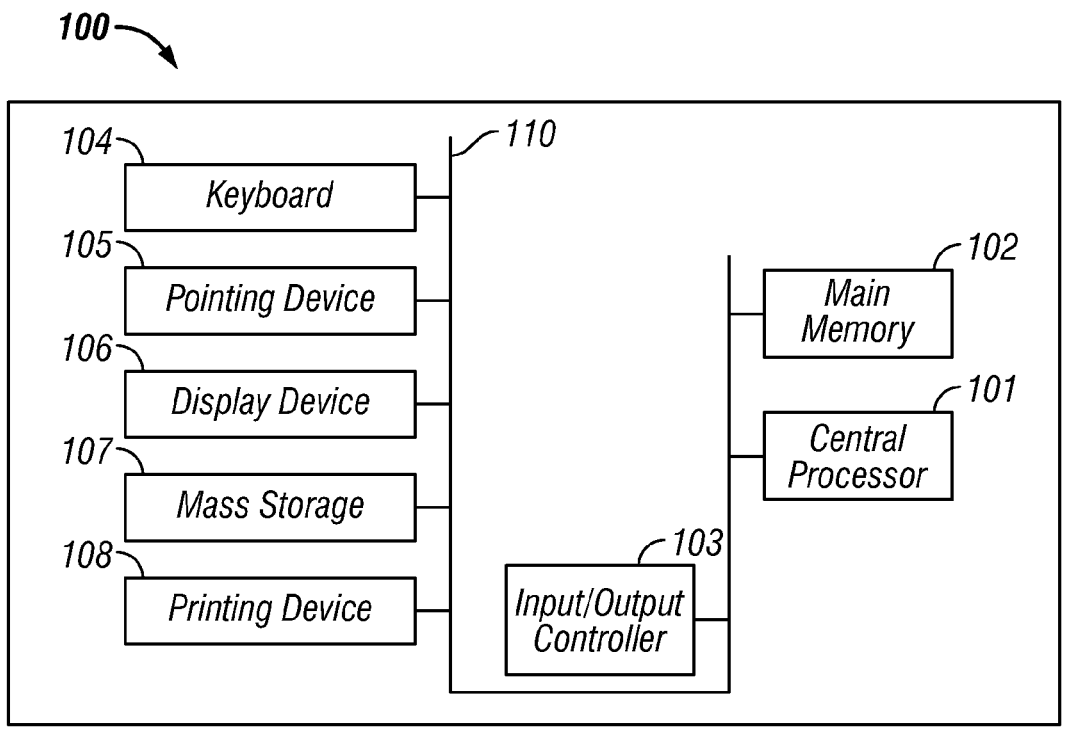
FIG. 1 illustrates a schematic view of a data-processing system in which an embodiment may be implemented.
Figure 2:
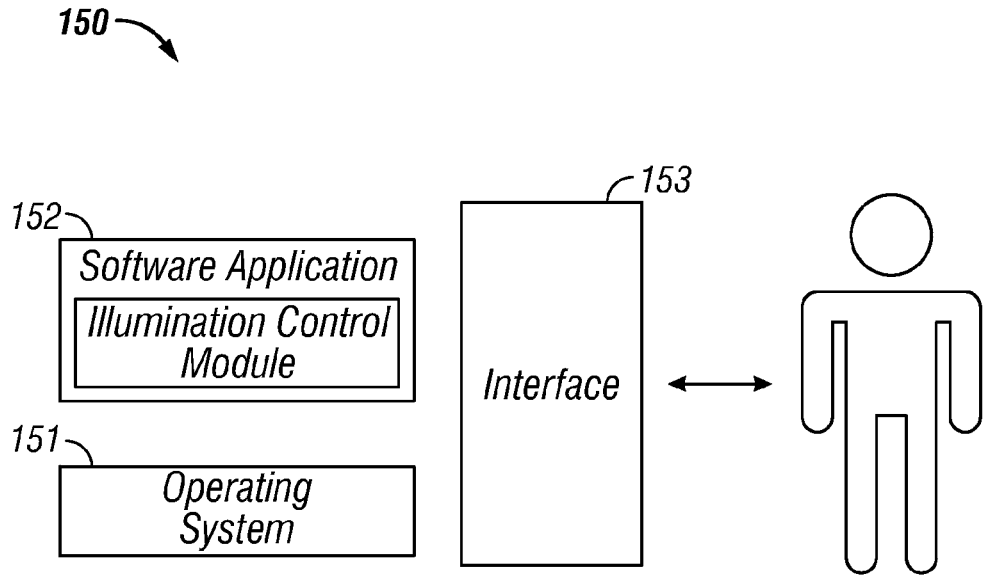
FIG. 2 illustrates a schematic view of a software system including an operating system, application software, and a user interface for carrying out an embodiment.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the present invention.

As illustrated in FIG. 1, the disclosed embodiments may be implemented in the context of a data-processing system 100 comprising, for example, a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a rendering device 108 (e.g., printer, scanner, fax machine, etc), for example, may be associated with the data-processing system 100 as desired. As illustrated, the various components of data-processing system 100 communicate electronically through a system bus 110 or similar architecture. The system bus 110 may be a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1. Software application 152, stored in main memory 102 and on mass storage 107, generally includes a kernel or operating system 151 and a shell or interface 153. One or more application programs, such as software application 152, may be "loaded" (i.e., transferred from mass storage 107 into the main memory 102) for execution by the data-processing system 100. The data-processing system 100 receives user commands and data through user interlace 153; these inputs may then be acted upon by the data-processing system 100 in accordance with instructions from operating module 151 and/or software application 152.

The following discussion is intended to provide a brief, general description of suitable computing environments in which the system and method may be implemented. Although not required, the disclosed embodiments will be described in the general context of computer-executable instructions, such as program modules, being executed by a single computer.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 153, which is preferably a graphical user interface (GUI), can serve to display results, whereupon a user may supply additional inputs or terminate a particular session. In some embodiments, operating system 151 and interface 153 can be implemented in the context of a "Windows" system. It can be appreciated, of course, that other types of operating systems and interfaces may be alternatively utilized. For example, rather than a traditional "Windows" system, other operation systems such as, for example, Linux may also be employed with respect to operating system 151 and interface 153. The software application 152 can include an illumination control module for detecting and tracking location of a targeted subject. The illumination control module 152 may also be employed to calculate an offset position for controlling multiple coordinated illumination sources to provide total illumination for the subject within eye safety limits. Software application module 152, on the other hand, can include instructions such as the various operations described herein with respect to the various components and modules described herein such as, for example, the method 400 depicted in FIG. 4.

The description herein is presented with respect to particular embodiments of the present invention, which may be embodied in the context of a data-processing system such as, for example, data-processing system 100 and computer software system 150 illustrated respectively to FIGS. 1-2. Such embodiments, however, are not limited to any particular application or any particular computing or data-processing environment. Instead, those skilled in the art will appreciate that the disclosed system and method may be advantageously applied to a variety of system and application software. Moreover, the present invention may be embodied on a variety of different computing platforms, including Macintosh, UNIX, LINUX, and the like.

Figure 3:
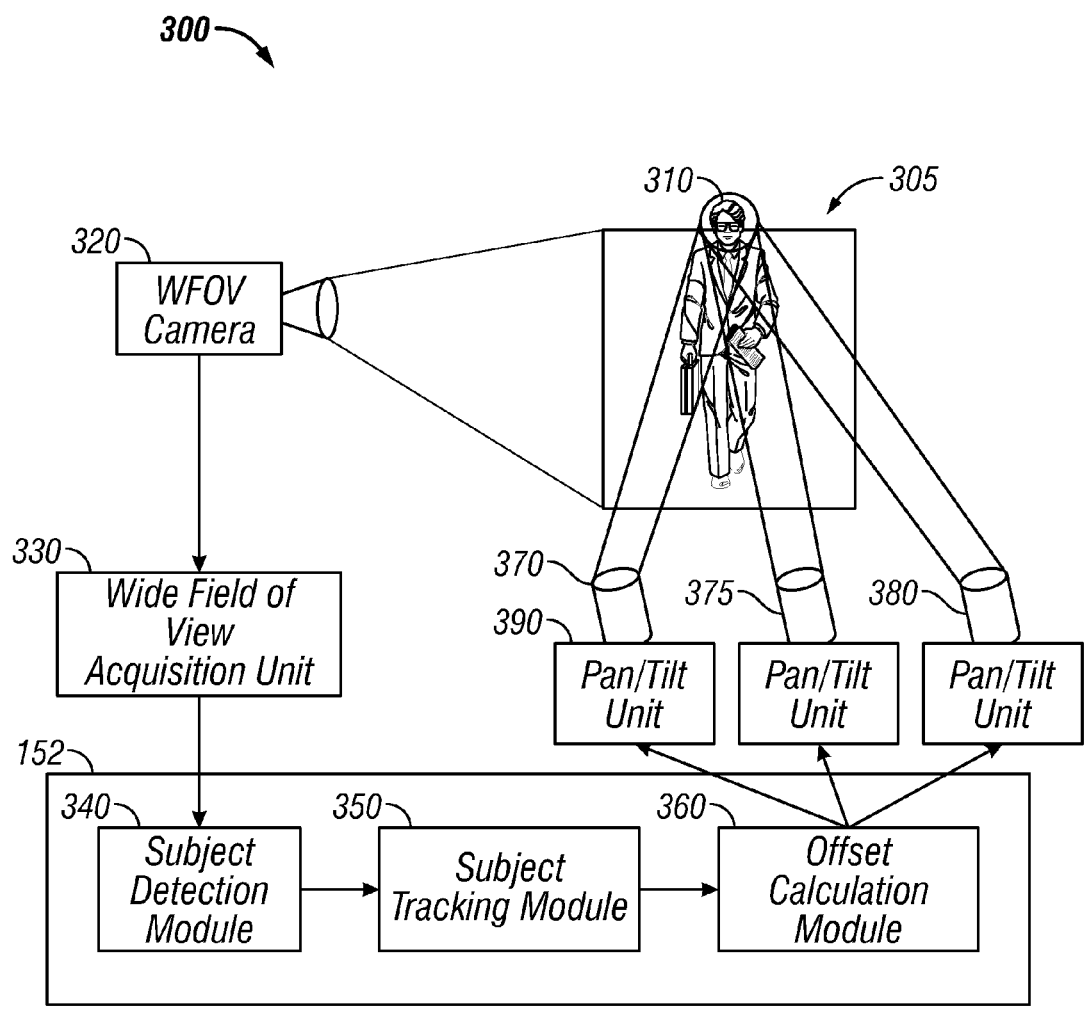
FIG. 3 illustrates a block diagram of a distributed agile illumination system associated with an illumination control module, in accordance with the disclosed embodiments.

FIG. 3 illustrates a block diagram of a distributed agile illumination system 300 associated with an illumination control module 152, in accordance with the disclosed embodiments. Note that in FIGS. 1-4, identical or similar parts or elements are generally indicated by identical reference numerals. The illumination system 300 may be employed for projecting a large amount of illumination on a targeted subject at a larger distance and an eye safe level of illumination at a close range. The system 300 may be employed in association with various image-based recognition systems for identifying an object within an environment. Note that the term "subject" may be utilized interchangeably with the term "object".

The system 300 generally includes a wide field of view camera (WFOV) 320, two or more active illumination sources 370, 375, and 380, a wide field of view acquisition unit 330, and the illumination control module 152. The wide field of view camera 320 described herein may be, for example, a wide angle stereo camera or electronic device with video capabilities. The wide field of view camera 320 may be employed for surveillance of a scene 305 having one or more subjects of interest, such as people. The wide field of view camera 320 includes wide-angle lenses whose focal length is substantially shorter than focal length of a normal lens, thereby providing a closer imagery of the scene 305.

The wide field of view camera 320 may provide wide angular fields of view for capturing images of the entire scene 305 and an individual subject 310 moving at high speed. The subject 310 may be positioned near the WFOV camera 320 or may be positioned at a large stand-off distance from the WFOV camera 320. The exemplary object to be detected in the illustrative image may be a human face. Those skilled in the art will appreciate that any image can be processed to detect any specific biometric features for biometric identification (e.g., facial pattern recognition, iris pattern recognition etc).

The illumination control module 152 may be a software application including computer executable instructions executed by the data processing system 100, or other computing system environment. The illumination control module 152 may run as a stand-alone digital video tool, an embedded function, or may be incorporated into other digital image/video applications to provide enhanced functionality. The illumination control module 152 includes a subject detection module 340, a subject tracking module 350, and an offset calculation module 360 that can be programmed to detect the subject predicted location and to determine an offset position for each illumination source 370, 375, and 380.

The wide field of view acquisition unit 330 associated with the wide field of view camera 320 retrieves the images captured by the camera 320. The acquisition unit 330 processes images from the camera 320 to determine the coordinates of the specific location of interest such as, for example, the face and eyes of the subject 310 to be identified. The subject tracking module 350 determines a relative geometric location of the illumination sources 370, 375, and 380 and the wide field camera 320 with respect to each other. The predicted location of the subject 310 may also be determined by the subject detection and subject tracking module 340 and 350. The offset calculation module 360 determines an offset position for each of the independent illumination source 370, 375, and 380 utilizing the subject predicted location and the geometric location.

A pan/tilt device 390 may be connected to each illumination source 370, 375, and 380 for controlling motion of the illumination source 370, 375, and 380 based upon the offset position. The pan/tilt device 390 utilizes the offset position to point each illumination source 370, 375, and 380 towards the subject 310 in order to provide maximum illumination on the subject 310 to get better imagery. The illumination sources 370, 375, and 380 may be employed for active illumination. Alternatively, the pan/tilt device 390 may aim a mirror associated with each illumination source 370, 375, and 380 and may be moved to direct light from the illuminators to the subject. This allows the illumination devices to be in a fixed position. The illumination sources 370, 375, and 380 may emit photons with near infra-red (NIR) wavelengths which are reflected from the subject 310 and subsequently detected by an imaging system.

The multiple coordinated illumination sources 370, 375, and 380 individually emit eye safe levels of illumination, but when pointed at the same subject 310 at a long distance can provide more illuminations than a single eye safe illuminator. The multiple illumination sources 370, 375, and 380 may be spatially separated so that at close ranges the subject 310 cannot be in a position to absorb light from the illuminators. At longer distances the independent illuminators 370, 375, and 380 can be pointed to converge and combine their illuminations on the single subject 310.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 4:
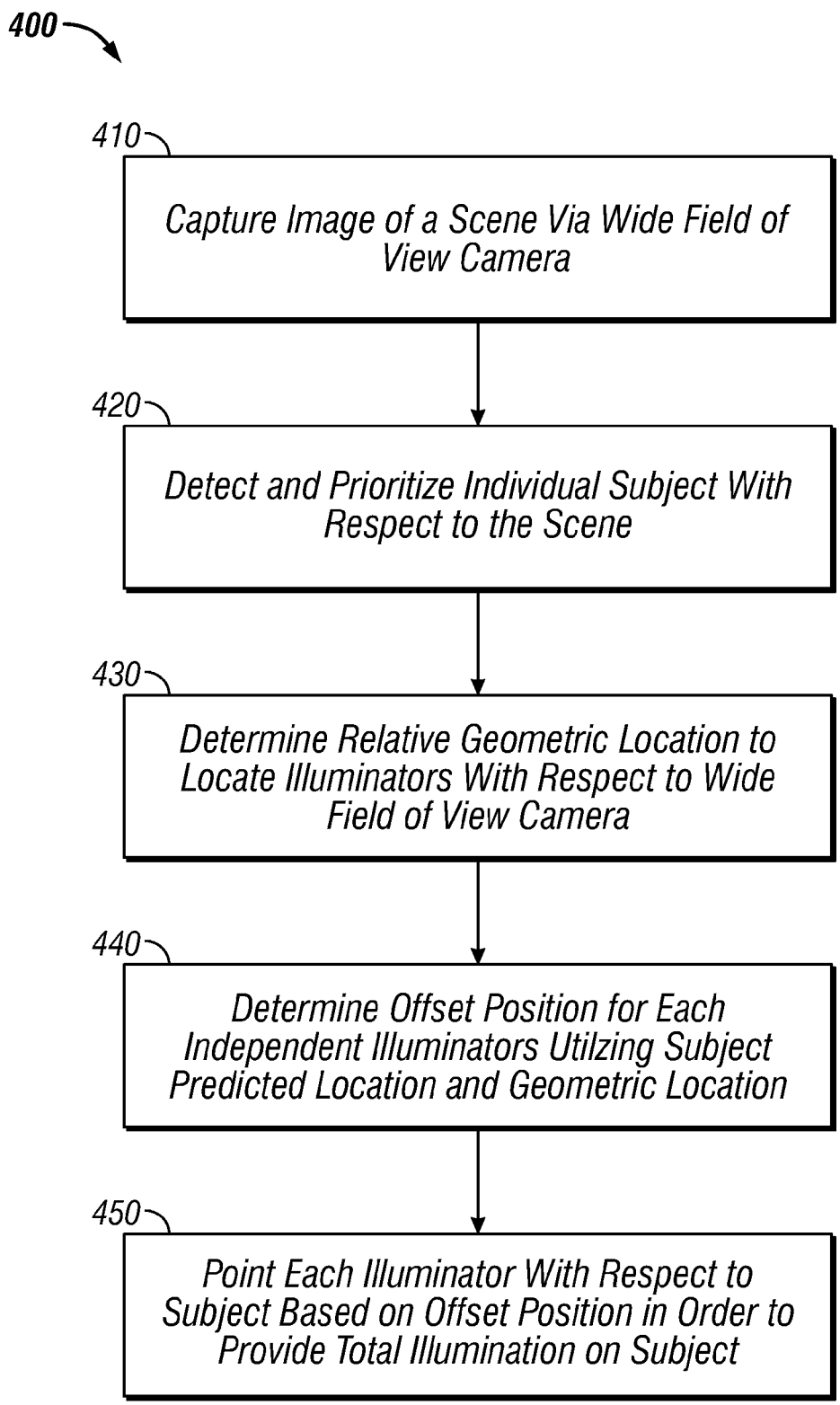
FIG. 4 illustrates a high level flow chart of operation illustrating logical operational steps of a method for projecting a large amount of illumination on a specific subject at a distance and an eye safe level of illumination at a close range, in accordance with the disclosed embodiments.

FIG. 4 illustrates a high level flow chart of operation illustrating logical operational steps of a method 400 for projecting a large amount of illumination on a specific subject at a distance and an eye safe level of illumination at a closer range, in accordance with the disclosed embodiments. Note that the method 400 can be implemented in the context of a computer-useable medium that contains a program product. The method 400 may be implemented in the context of a computer-usable medium containing a program product (e.g., software application, software modules, etc).

The entire scene 305 may be imaged via the wide field of view camera 320, as depicted at block 410. The individual subject 310 with respect to the scene 305 may be detected and prioritized, as illustrated at block 420. An initial calibration may be performed to determine a relative geometric location to locate multiple coordinated illumination sources 370, 375, and 380 with respect to the wide field camera 320, as indicated at block 430. The subject predicted location and the geometric location may be employed to determine an offset position for each of the independent illumination sources 370, 375, and 380, as depicted at block 440. The illumination sources 370, 375, and 380 may be pointed with respect to the subject 310 based on the offset position in order to provide total illumination on the subject 310 to get better imagery, as indicated at block 450. Such an approach provides more total illumination on the subject 310 than a single illuminator can provide thereby permitting a biometric acquisition and surveillance system to acquire a better imagery.

Note that programs defining functions with respect to the disclosed embodiments may be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media such as computer and telephone networks including, for example, Ethernet, the Internet, wireless networks, other networked systems. Thus, the method 400 described herein can be deployed as process software in the context of a computer system or data-processing system as that depicted in FIGS. 1-2.

The system 300 does not consume more electric power and proper exposure compensation can be achieved by adjusting the flash intensity. The method and system described herein may be incorporated into any type of image capturing device and employed in the increasingly common long-distance surveillance systems prevalent in security/homeland security applications. The approach can also ensure that the subject 310 may be prevented from being illuminated with high intensity illumination and the illumination received by the subject's eyes is constrained to long-term safe levels.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:
1. A distributed illumination system, comprising:
  an image capturing device for acquiring an image associated with a scene via said image capturing device to thereafter detect and prioritize a targeted subject with respect to said scene;

at least two active illumination sources, wherein a flash intensity of said at least two active illumination sources is adjusted to compensate for proper exposure; and a processor that determines a relative geometric location to calibrate and locate said at least two active illumination sources with respect to said image capturing device, wherein said at least two active illumination sources are spatially separated based on an offset position, wherein said processor computes said offset position for said at least two active illumination sources based on a predicted location of said targeted subject and said relative geometric location of said at least two active illumination sources to point pan/tilt devices associated with each illumination source towards said targeted subject to project an eye safe level of illumination from said at least two active illumination sources on said targeted subject when said targeted subject is located at close range to said illumination source and to acquire enhanced imagery of a facial pattern or an iris pattern of said targeted subject and to biometrically identify said targeted subject at varying distances to the targeted subject.

2. The system of claim 1 wherein:

illumination from said at least two active illumination sources is converged and combined based on said offset position; and illumination from said at least two active illumination sources is projected on said targeted subject located at said predicted location.

3. The system of claim 1 further comprising a tracker for tracking said targeted subject in order to predict a location of said targeted subject with respect to said scene.

4. The system of claim 1 wherein said image capturing device comprises a wide field of view camera.

5. The system of claim 1 wherein said pan/tilt device controls at least one mirror for directing illumination from said at least two illumination devices toward said targeted subject.

6. The system of claim 1 further comprising:

a tracker for tracking said targeted subject in order to predict a location of said targeted subject with respect to said scene; and at least one mirror for directing illumination from said at least two illumination devices toward said targeted subject, wherein said image capturing device comprises a wide field of view camera and wherein said pan/tilt device controls at least one mirror for directing illumination from said at least two illumination devices toward said targeted subject.

7. A system, comprising:

a processor;

a data bus coupled to said processor; and a computer-usable medium embodying computer code, said computer-usable medium being coupled to said data bus, said computer program code comprising instructions executable by said processor and configured for:

acquiring an image associated with a scene via an image capturing device to thereafter detect and prioritize a targeted subject with respect to said scene;

determining a relative geometric location to locate at least two active illumination sources with respect to said image capturing device wherein said at least two active illumination sources are spatially separated based on an offset position, wherein a flash intensity of said at least two active illumination sources is adjusted to compensate for proper exposure; and computing said offset position for said at least two active illumination sources based on a calibration and a predicted location of said targeted subject and said relative geometric location of said at least two active illumination sources to point pan/tilt devices associated with each illumination source towards said targeted subject to project an eye safe level of illumination from said at least two active illumination sources on said targeted subject when said targeted subject is located at close range to said illumination source and to acquire enhanced imagery of a facial pattern or an iris pattern of said targeted subject and to biometrically identify said targeted subject at varying distances to the targeted subject.

8. The system of claim 7 wherein said instructions are further configured for:

converging and combining illumination from said at least two active illumination sources based on said offset position; and projecting said illumination from said at least two active illumination sources on said targeted subject located at said predicted location.

9. The system of claim 7 wherein said instructions are further configured for tracking said targeted subject in order to predict a location of said targeted subject with respect to said scene.

10. The system of claim 7 wherein said image capturing device comprises a wide field of view camera.

11. The system of claim 7 wherein said pan/tilt device controls at least one mirror for directing illumination from said at least two illumination devices toward said targeted subject.

12. A method, comprising:

acquiring an image associated with a scene via an image capturing device to thereafter detect and prioritize a targeted subject with respect to said scene;

determining a relative geometric location to locate at least two active illumination sources with respect to said image capturing device wherein said at least two active illumination sources are spatially separated based on an offset position, wherein a flash intensity of said at least two active illumination sources is adjusted to compensate for proper exposure; and computing said offset position for said at least two active illumination sources based on a calibration and a predicted location of said targeted subject and said relative geometric location of said at least two active illumination sources to point pan/tilt devices associated with each illumination source towards said targeted subject to project an eye safe level of illumination from said at least two active illumination sources on said targeted subject when said targeted subject is located at close range to said illumination source and to acquire enhanced imagery of a facial pattern or an iris pattern of said targeted subject and to biometrically identify said targeted subject at varying distances to the targeted subject.

13. The method of claim 12 further comprising:

converging and combining illumination from said at least two active illumination sources based on said offset position; and projecting said illumination from said at least two active illumination sources on said targeted subject located at said predicted location.

14. The method of claim 12 further comprising tracking said targeted subject in order to predict a location of said targeted subject with respect to said scene.

15. The method of claim 12 wherein said image capturing device comprises a wide field of view camera.

16. The method of claim 12 wherein said pan/tilt device controls at least one mirror for directing illumination from said at least two illumination devices toward said targeted subject.

17. The method of claim 12 further comprising tracking said targeted subject in order to predict a location of said targeted subject with respect to said scene, wherein said image capturing device comprises a wide field of view camera, and wherein said pan/tilt device controls at least one mirror for directing illumination from said at least two illumination devices toward said targeted subject.

* * * * *